United States Patent
Deljo et al.

(10) Patent No.: US 8,155,986 B2
(45) Date of Patent: Apr. 10, 2012

(54) COLLAPSIBLE ITINERARIES

(75) Inventors: Shai Deljo, Palo Alto, CA (US); Anat Amibar, Sunnyvale, CA (US); Ofer Shaked, Saratoga, CA (US); James Yang, Mountain View, CA (US); Lior Delgo, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 129 days.

(21) Appl. No.: 11/544,176

(22) Filed: Oct. 6, 2006

(65) Prior Publication Data

US 2007/0112606 A1  May 17, 2007

Related U.S. Application Data

(60) Provisional application No. 60/724,448, filed on Oct. 7, 2005.

(51) Int. Cl.
  G06Q 10/00 (2012.01)
  G06Q 50/00 (2012.01)
  G06F 7/00 (2006.01)
(52) U.S. Cl. ............... 705/6; 705/5; 707/705; 707/722
(58) Field of Classification Search ............... 705/5–6; 707/705, 722
  See application file for complete search history.

(56) References Cited

U.S. PATENT DOCUMENTS

| | | | |
|---|---|---|---|
| 2002/0054090 A1* | 5/2002 | Silva et al. | 345/747 |
| 2002/0133381 A1* | 9/2002 | Tso | 705/5 |
| 2003/0040946 A1* | 2/2003 | Sprenger et al. | 705/6 |
| 2003/0120526 A1* | 6/2003 | Altman et al. | 705/5 |
| 2004/0093321 A1* | 5/2004 | Roustant et al. | 707/3 |
| 2004/0268219 A1* | 12/2004 | Brown et al. | 715/500 |
| 2005/0004819 A1* | 1/2005 | Etzioni et al. | 705/5 |
| 2005/0114790 A1* | 5/2005 | Dunbar et al. | 715/785 |
| 2005/0216404 A1* | 9/2005 | Sims et al. | 705/40 |
| 2006/0031214 A1* | 2/2006 | Solaro et al. | 707/4 |
| 2006/0106655 A1* | 5/2006 | Lettovsky et al. | 705/6 |
| 2007/0094056 A1* | 4/2007 | Kang et al. | 705/5 |
| 2008/0021745 A1* | 1/2008 | Razza et al. | 705/5 |
| 2008/0141158 A1* | 6/2008 | Daughtrey | 715/771 |

* cited by examiner

Primary Examiner — Fadey Jabr
(74) Attorney, Agent, or Firm — James J. DeCarlo; Greenberg Traurig, LLP

(57) ABSTRACT

Method and system for grouping and displaying travel itineraries are disclosed. The method for grouping travel itineraries includes receiving a list of travel itineraries, grouping the list of travel itineraries to one or more clusters according to a set of grouping parameters, selecting a lead itinerary to represent each of the one or more clusters, determining additional itineraries in each cluster, and displaying the lead itinerary and a link referencing to further details about the additional itineraries in each cluster.

11 Claims, 9 Drawing Sheets

Figure 1a

$156　　Continental
per person　7:00a-8:08a　　　Non-stop　IAD-EWR　　
　　　　　　3 return times starting at 7:00a
　　　　　　View Details - Send via Email - Send via IM
　　　　　　continental.com

$156　　Continental
per person　9:00a-10:10a　　Non-stop　IAD-EWR　　
　　　　　　4 return times starting at 7:00a
　　　　　　View Details - Send via Email - Send via IM
　　　　　　continental.com

$156　　Continental
per person　1:00p-2:15p　　　Non-stop　IAD-EWR　　
　　　　　　2 return times starting at 11:00a
　　　　　　View Details - Send via Email - Send via IM
　　　　　　continental.com

$162　　Multiple Carriers
per person　7:00a-8:08a　　　Non-stop　IAD-EWR　　
　　　　　　7 return times starting at 6:10a
　　　　　　View Details - Send via Email - Send via IM
　　　　　　orbitz.com

$162　　United
per person　7:35a-8:50a　　　Non-stop　IAD-EWR　　
　　　　　　8 return times starting at 6:10a
　　　　　　View Details - Send via Email - Send via IM
　　　　　　orbitz.com

COLLAPSIBLE ITINERARIES

CROSS-REFERENCE TO RELATED APPLICATIONS

This application claims the benefit of application No. 60/724,448, "Collapsible Itineraries," filed Oct. 7, 2005, which is incorporated herein in its entirety by reference.

FIELD OF THE INVENTION

The present invention relates to the field of Internet applications. In particular, the present invention relates to a method and system for grouping and displaying travel itineraries.

BACKGROUND OF THE INVENTION

The proliferation of travel services on the Internet enables users to search and compare travel alternatives offered by airline carriers, hotels, car rental companies, and online travel agents with their computers. FIG. 1a and FIG. 1b illustrate a display list of airline itineraries by a conventional method. As shown in FIG. 1a and FIG. 1b, for the price of $156 per person, there are three itineraries displayed for departure flights at 7:00 a.m. Similarly, there are multiple itineraries for departure flights at 9:00 a.m. If a user is interested in a different departure time, the 7:00 a.m. and 9:00 a.m. departure flights would be irrelevant to the user. Since limited number of itineraries may be displayed on a display device, such as a computer or personal digital assistant (PDA) screen, users are forced to spend time in scanning a long list of travel itineraries over pages of display screens to reach the results that might interest them, many of which are quite similar to each other. The frequent occurrence of similar search results may be perceived as spam or irrelevant, which contributes to a poor user experience of the travel search engine.

Therefore, there is a need for a method and system to allow users to scan a shorter list of travel itineraries to reach the results they are interested in, without losing breadth (for example variety of carriers) and depth (for example multiple itinerary options for similar results).

SUMMARY

The disclosed method for grouping and displaying itineraries combines similar clusters of flight itineraries on the search results page, increases perceived relevance in the results set through less spam, and speeds up the process of choosing a result by the user, while maintaining all the options to retrieve the information available to the user. It prevents spamming of the result listings with multiple, almost-identical itineraries. As a result, it improves user comprehension of the result listings by displaying more varieties of offers on the first result-page, and on the subsequent result pages. In addition, the disclosed method improves usability by making it easier for users to scan results and focus on the ones most interesting to them without having to scan hundreds of results, many of which are very similar to one another. Moreover, the disclosed method maintains relevancy and depth of results by keeping collapsed itineraries accessible to the user on demand via clicking on a link indicating multiple similar results are available for a particular set of selection criteria, as opposed to the approach of filtering similar itineraries altogether.

In one embodiment, a method for grouping travel itineraries includes receiving a list of travel itineraries, grouping the list of travel itineraries into one or more clusters according to a set of grouping parameters, selecting a lead itinerary to represent each of the one or more clusters, determining additional itineraries in each cluster, and displaying the lead itinerary and a link that refers to further details about the additional itineraries in each cluster.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 1a and FIG. 1b illustrate a display list of airline itineraries by a prior art method.

FIG. 3a and FIG. 3b illustrate a display list of collapsible itineraries sorted by price according to an embodiment of the present invention.

FIG. 3c and FIG. 3d illustrate details of a group of collapsed itineraries according to an embodiment of the present invention.

FIG. 4 illustrates a display list of collapsible itineraries sorted by departure times according to an embodiment of the present invention.

Like numbers are used throughout the figures.

DESCRIPTION OF EMBODIMENTS

Methods and systems are provided for displaying itineraries. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed descriptions which follow are presented in terms of procedures, steps, logic blocks, processing, and other symbolic representations of operations on data bits that can be performed on computer memory. A procedure, computer-executed step, logic block, process, etc., are here conceived to be a self-consistent sequence of steps or instructions leading to a desired result. These steps utilize physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

According to embodiments of the present disclosure, similar itineraries that are grouped and collapsed are such itineraries that share a set of grouping parameters, such as price, carrier, and departure flight time. A lead itinerary is selected out of the similar itineraries to represent the group which is displayed to the user. For example, a default lead itinerary may be the one with earliest inbound (return) time.

Figure 2A:
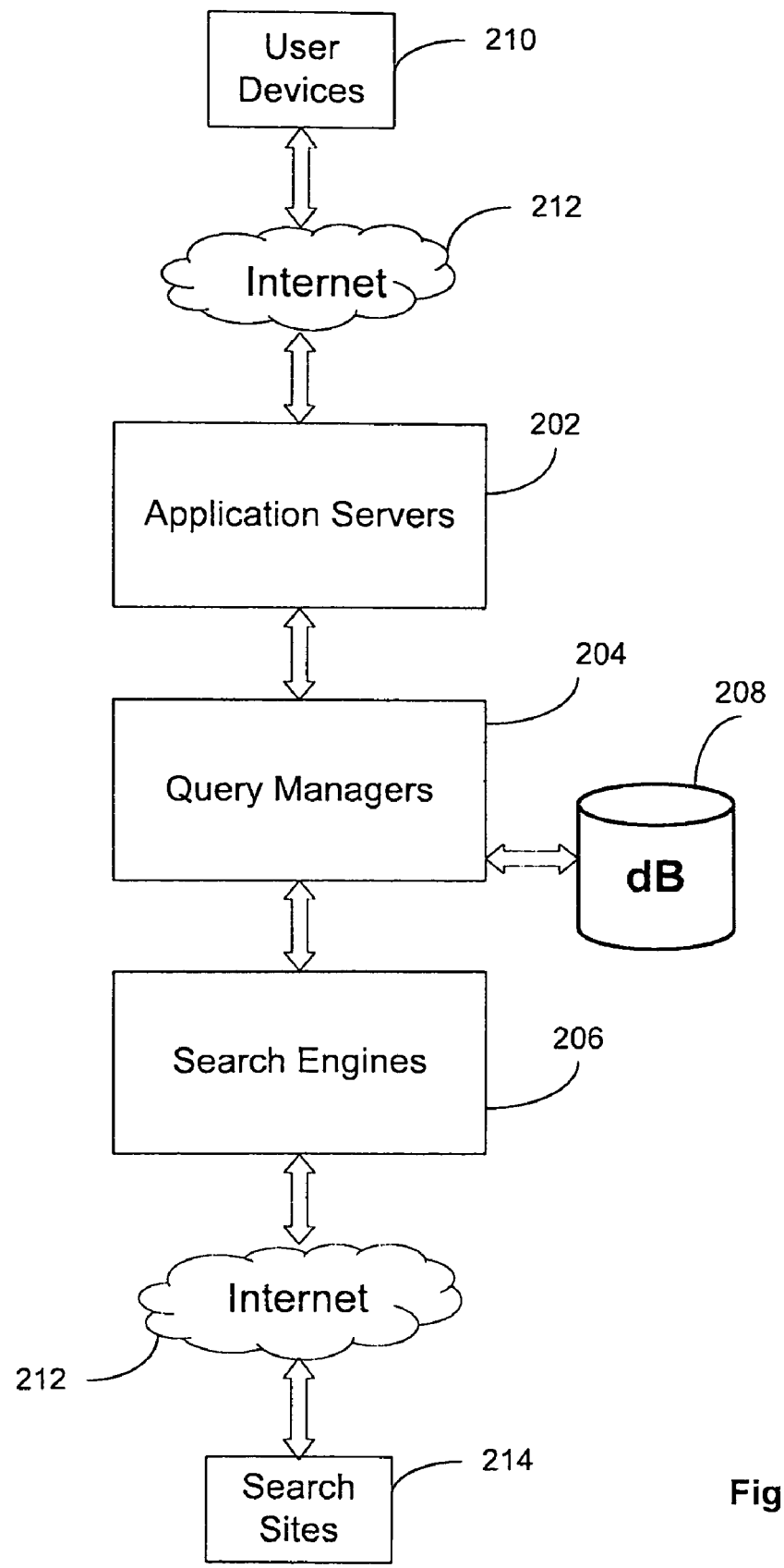
FIG. 2a and FIG. 2b illustrate a system for grouping and displaying itineraries according to an embodiment of the present invention.
Figure 2B:
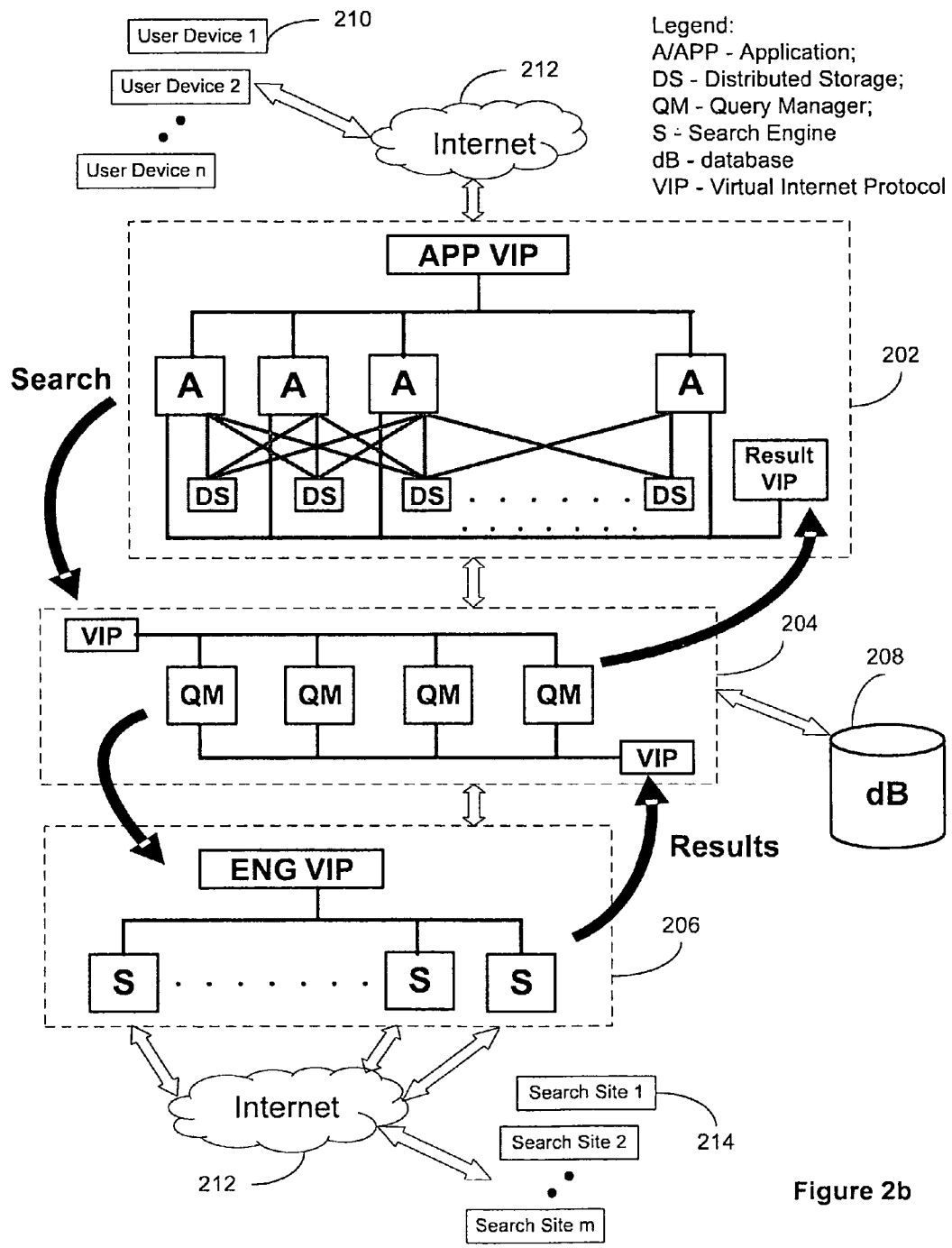

FIG. 2a and FIG. 2b illustrate a system for grouping and displaying itineraries according to an embodiment of the present invention. As shown in FIG. 2a, the system includes one or more application servers 202, one or more query managers 204, one or more search engines 206, and a database 208. The application servers 202 receive search requests from user devices 210 through the Internet 212. The users' search requests are passed to the query managers 204 which formulated search queries based on the users' search requests for the search engines 206. The query managers 204 may also access any source of travel itinerary listings, including but not limited to data feeds 216, cached results from previous searches 208, and third party software applications or systems 218. The search engines 206 searches search sites 214 using data retrievers (not shown) to retrieve search results (travel itineraries) in response to the search queries. Note that in other embodiments, the query managers 204 and the search engines 206 may be combined to form a meta-search engine or web automation engine.

The search engines 206 retrieve travel itineraries, which are sent via the application servers 202 to the user browser. At each user device 210, a JavaScript engine running as a part of the user browser groups the results in clusters according to a set of grouping parameters. The set of grouping parameters may include one or more of the following criteria: carrier, time of departure, price of the ticket, number of stops, airport, frequent flyer alliance, type of aircraft, flight class (first/business/economy), meal service, amenities (personal TV or interactive games), etc. This list is not exhaustive. Upon grouping the travel itineraries to one or more clusters, the JavaScript engine selects a lead itinerary to represent each of the one or more clusters and determines a number of itineraries in each cluster. Then, the lead itinerary and a link that references further details about the additional itineraries in each cluster are displayed. The user is shown with a result which exposes the common details to the grouping parameters (options) of each cluster, and with an indication of the cluster result set and a link to expand the cluster. Note that in other embodiments, the functions performed by the JavaScript engine described above may be performed on the application servers 202, and the results generated by the JavaScript engine on the application server may be sent to the user devices 210.

In another embodiment, the groups generated may be based on an approximation of an exact match. For example, itineraries may be included in the same cluster if the price is within a predetermined amount (for example ten dollars) of the exact price. This approximation method of an exact match may be applied to other grouping parameters, for example, within fifteen minutes of the departure or return time.

FIG. 2b illustrates an expanded view of certain blocks of FIG. 2a according to an embodiment of the present invention. The application servers 202 include an application Virtual Internet Protocol (APP VIP), a group of individual application server (A) and its corresponding distributed storage (DS), and a Result Virtual Internet Protocol (Result VIP). The APP VIP handles communication via the Internet 212 between the application servers 202 and the user devices 210, shown as user device 1 to user device n. The Result VIP handles communication between the application servers 202 and the query managers 204.

The query managers 204 include a first Virtual Internet Protocol (VIP), a group of individual query managers (QM), and a second Virtual Internet Protocol (VIP). The first VIP handles communication with the application servers 202, and the second VIP handles communications with the search engines 206. The search engines 206 include an engine virtual Internet Protocol (ENG VIP), and a group of individual search engines (S). The ENG VIP handles communication between the search engines 206 and the query managers 204. Each individual search engine (S) conducts searches via the Internet 212 at one or more search sites 214, shown as search site 1 to search site m.

Figure 3A:

FIG. 3a and FIG. 3b illustrate a display list of collapsible itineraries sorted by price according to an embodiment of the present invention. FIG. 3a and FIG. 3b show a default view of the itineraries sorted by price. The lead itinerary indicates the number of itineraries belonging to a particular group. For example, in the first group, there are three itineraries under the group "return times" starting at a particular time (such as 7:00 a.m.). Typically, the lead itinerary displays the time (for example 7:00 a.m.) that indicates the earliest return time combination available. The link (3 return times) conveys the message that there are more itinerary options, and it has a call to action by clicking the link (3 return times) in order to view those options. The "GO!" button provides a clear call to action to continue with the booking process if the lead itinerary is selected. In addition, information of the itineraries may be sent to or shared with another user by clicking the Send via Email or Send via IM link.

Figure 3C:
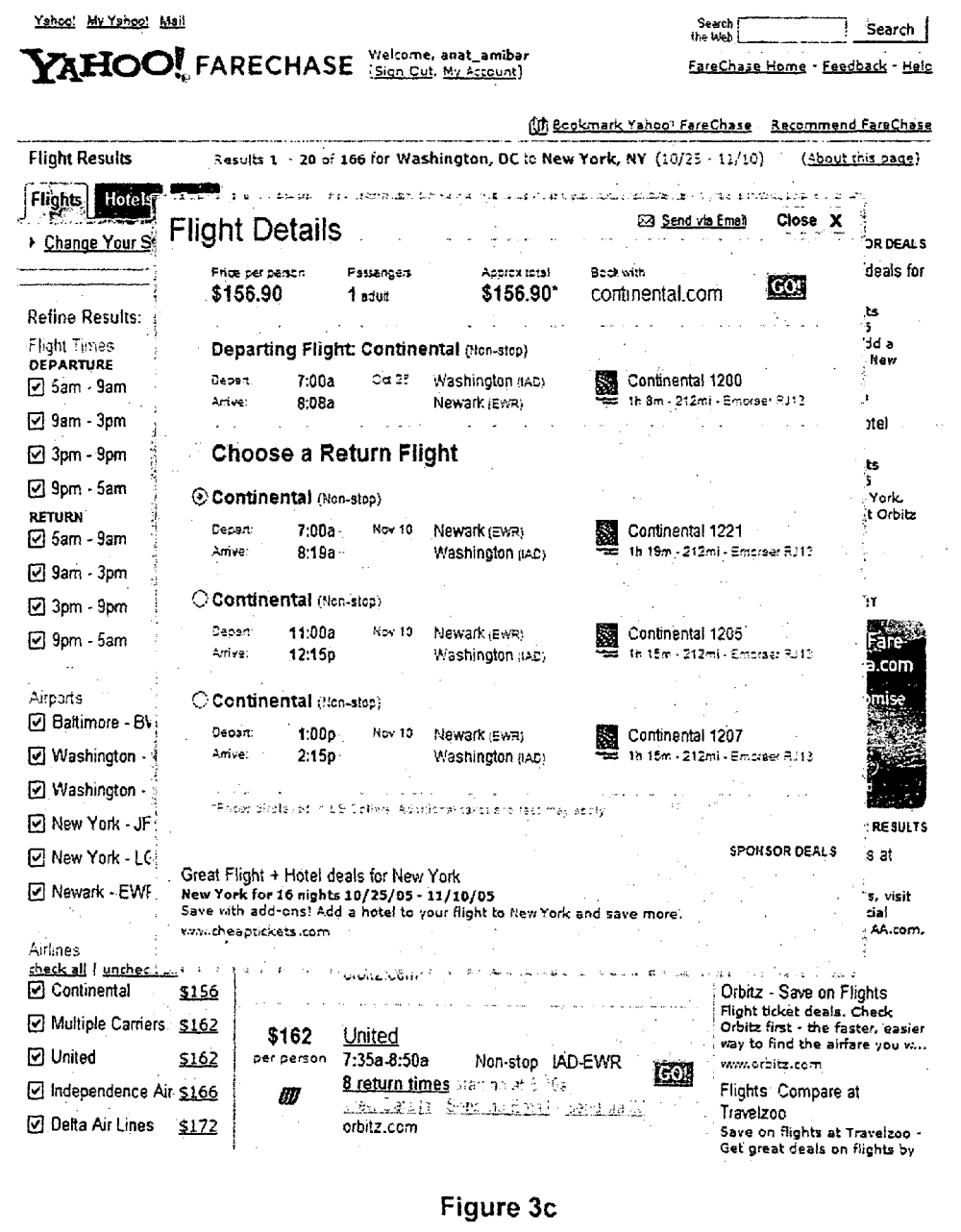
Figure 3D:

FIG. 3c and FIG. 3d illustrate details of a group of collapsed itineraries according to an embodiment of the present invention. In the example shown in FIG. 3a and FIG. 3b, when the user clicks the 3 return times link, the browser displays details of the group of three collapsed itineraries, such as price ($156.90), booking source (continental.com), outbound flight (Continental 1200), and all return options (Continental 1221, 1205, and 1207), as shown in FIG. 3c and FIG. 3d. The first listed (default) itinerary is set to the original lead itinerary, and the additional return departure and arrival times are sorted in an ascending order, from 7:00 a.m. to 1:00 p.m. The radio buttons provide an easy-to-use selection tool allowing users to select their preferable return times. Similar to FIG. 3a and FIG. 3b, the "GO!" button provides a clear call to action to continue with the booking process after a specific return time is selected. In addition, the flight options may be transferred or shared via email or IM. If users wish to go back to the initial results view, the "Close" or "X" button closes the details window and "collapse" the information contained in the 3 return times link. In another embodiment, the collapsible itineraries may be displayed inline below the lead itinerary, and may be presented as whole itineraries rather than broken down to common outbound leg and separate inbound leg options.

In yet another embodiment, the user may choose to narrow the list of itineraries. In the examples shown in FIGS. 3a-3d, if the narrowing affects a common outbound flight of the collapsed group, the whole group is narrowed out. For example, if the user chooses to narrow out a flight departing between 5:00 a.m. to 9:00 a.m., a collapsed group of itineraries that shares a departure flight at 6:30 a.m. will be eliminated altogether from the search result page, including all its return options. In the alternative, if the narrowing affects one or more of the return options of the collapsed group, only the affected return options will be eliminated. The message that describes the group of collapsed itineraries may need to be updated to reflect the narrowed-down set of itineraries.

Figure 1A:
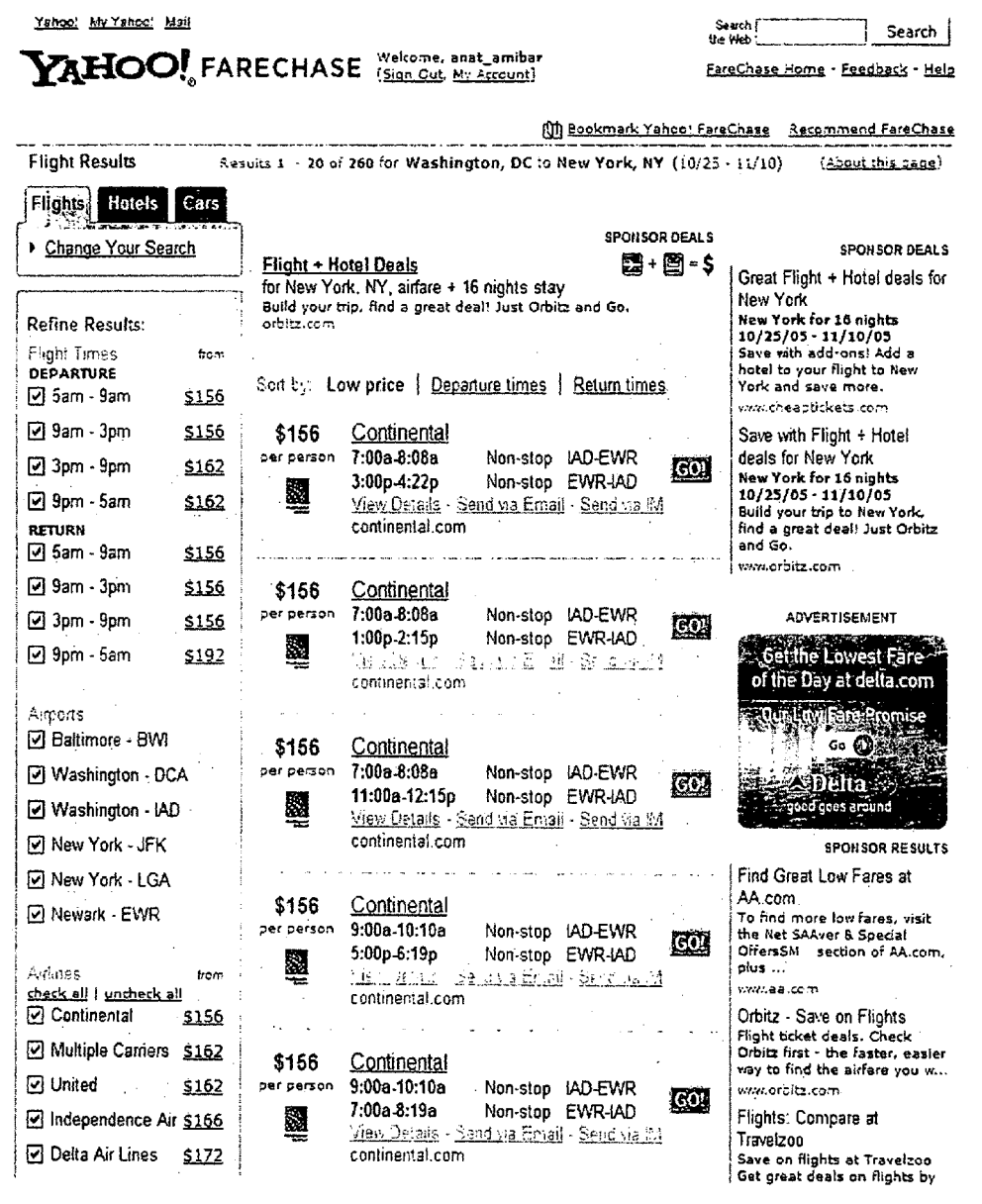
Figure 1B:
Figure 1B:
Figure 1B:
Figure 1B:
Figure 1B:
Figure 4:
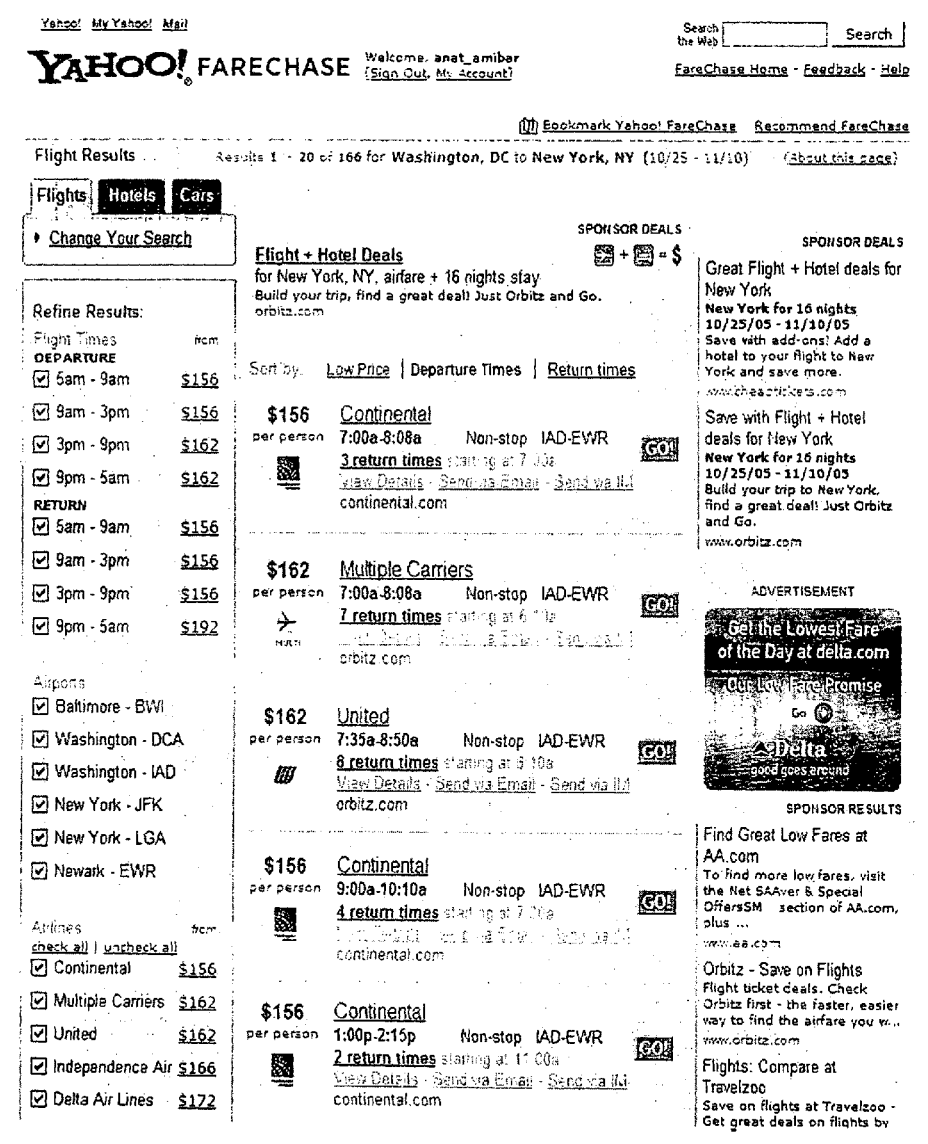

FIG. 4 illustrates a display list of collapsible itineraries sorted by departure times according to an embodiment of the present invention. The method for grouping and displaying itineraries sorted by departure time is similar to that sorted by price, which is described in association with FIGS. 3a and 3b. As shown in FIG. 4, the present invention is able to convey to the users more information about airline flight itineraries on a single page. In particular, FIG. 4 displays three return flights offered by Continental with departure times starting at 7:00 a.m., seven return flights offered by Multiple Carriers with departure times starting at 6:10 a.m., eight return flights offered United with departure times starting at 6:10 a.m., four return flights offered by Continental with departure times starting at 9:00 a.m., and two return flights offered by Continental with departure times starting at 11:00 a.m. There are a total of 24 itineraries accessible to users from this page, which is significantly more than the five itineraries shown in FIG. 1a displayed by a conventional method.

In yet another embodiment of the present disclosure, the method for grouping and displaying itineraries is applied to itineraries describing hotels. In one implementation, the following grouping parameters may be used: price, hotel class (number of stars), brand/hotel chain, location/proximity, and amenities. This list is not exhaustive. The method for grouping and displaying hotel itineraries is similar to that of airline flights described in association with FIGS. 3a-3d. In other embodiments, the disclosed method for grouping and displaying travel itineraries may work with any source of travel itinerary listings, both in dynamic form (as retrieved by the search engines in FIG. 2a) or in static form, or combinations thereof. Note that unlike the itineraries describing airlines, which are dynamic in nature because of the different inbound and outbound departure times. The itineraries describing hotels tend to be static in nature, as there are fewer changes to the itineraries describing hotels due to changes in time.

In yet another embodiment of the present disclosure, the method for grouping and displaying itineraries is applied to itineraries describing rental cars. In one implementation, the following grouping parameters may be used: price, rental agency, car model or type, pickup and/or drop-off location, proximity, and features of the car (such as GPS navigation system, DVD entertainment system). This list is not exhaustive. The method for grouping and displaying rental car itineraries is similar to that of airline flights described in association with FIGS. 3a-3d.

The disclosed method for grouping and displaying travel itineraries significantly improves user experience by delivering more relevant and comprehensive search results to users more quickly. It addresses a common complaint about the usability of meta-search engines, and it saves time for users to scan through a shorter list of search results to obtain desired information.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method comprising:
   receiving, by a computing device, a list of travel itineraries;
   grouping, using the computing device, the list of travel itineraries into a plurality of clusters of travel itineraries according to a set of grouping parameters;
   selecting, using the computing device, a respective lead itinerary from each of plurality of clusters, the respective lead itinerary for each cluster having a value of one of the set of grouping parameters shared by the travel itineraries in the respective cluster;
   determining, using the computing device, for each the plurality of clusters, a respective plurality of additional itineraries in the respective cluster such that a value of each of the set of grouping parameters for each of the respective plurality of additional itineraries matches the value of the respective grouping parameter for the respective lead itinerary;
   causing the display, on a display device, for each cluster of the plurality of clusters, the respective lead itinerary and a respective link referring to further details about the additional itineraries in the respective cluster, the display of the lead itinerary reflecting data relating to the lead itinerary that the lead itinerary shares with all additional itineraries in the respective cluster; and
   causing the display, on a display device, for one cluster of the plurality of clusters, details of the respective plurality of additional itineraries in the one of the plurality clusters in response to a user selecting the respective link associated with the respective lead itinerary displayed in relation to the one cluster of the plurality clusters, such that the respective lead itinerary is displayed first and the additional itineraries are displayed sorted according to the set of grouping parameters shared by the travel itineraries in the respective cluster.

2. The method of claim 1, wherein the list of travel itineraries comprises:
   travel itineraries in dynamic form that change with respect to time.

3. The method of claim 1, wherein the list of travel itineraries includes a list of airline reservations, and wherein the set of grouping parameters comprises at least one of carrier, time of departure, airfare, number of stops, airport, frequent flyer alliance, type of aircraft, flight class, meal service, or amenities, and wherein the common segment comprises at least one of a departure segment, a return segment, or an intermediate segment.

4. The method of claim 1, wherein the travel itineraries include a list of hotel reservations, and wherein the set of grouping parameters comprises price, hotel class, brand, location, and amenities.

5. The method of claim 1, wherein the travel itineraries include a list of rental car reservations, and wherein the set of grouping parameters comprises price, rental agency, model, type, pickup location, drop-off location, proximity, and features of the car.

6. The method of claim 1, wherein the respective link further indicates a number of itineraries in the cluster.

7. A computing device comprising:
a processor;
a display device;
a storage medium for tangibly storing thereon program logic for execution by the processor, the program logic comprising:
user browser logic executed by the processor for a browser, displayed on the display device, the user browser further comprising:
travel itinerary receiving logic executed by the processor for receiving, over a network, a list of travel itineraries,
travel itinerary grouping logic executed by the processor for grouping the list of travel itineraries into a plurality of clusters of travel itineraries according to a set of grouping parameters;
lead itinerary selection logic executed by the processor for selecting a respective lead itinerary from each of plurality of clusters, the respective lead itinerary for each cluster having a value of one of the set of grouping parameters shared by the travel itineraries in the respective cluster;
additional itinerary determination logic executed by the processor for determining, for each the plurality of clusters, a respective plurality of additional itineraries in the respective cluster; such that a value of each of the set of grouping parameters for each of the respective plurality of additional itineraries matches the value of the respective grouping parameter for the respective lead itinerary;
itinerary display logic executed by the processor for displaying, on the display device, via the user browser, for each of the plurality of clusters, the respective lead itinerary and a respective link referring to further details about the respective plurality of additional itineraries in the respective cluster; the display of the lead itinerary reflecting data relating to the lead itinerary that the lead itinerary shares with all additional itineraries in the respective cluster, and
additional itinerary detail display logic executed by the processor for displaying details of the respective plurality of additional itineraries in the one of the plurality clusters in response to a user selecting the respective link associated with the respective lead itinerary displayed in relation to the one cluster of the plurality clusters, such that the respective lead itinerary is displayed first and the additional itineraries are displayed sorted according to the set of grouping parameters shared by the travel itineraries in the respective cluster.

8. The computing device of claim 7, wherein the list of travel itineraries include a list of airline reservations, and wherein the set of grouping parameters comprises at least one of carrier, time of departure, airfare, number of stops, airport, frequent flyer alliance, type of aircraft, flight class, meal service, or amenities, and wherein the common segment comprises at least one of a departure segment, a return segment, or an intermediate segment.

9. The computing device of claim 7, wherein the travel itineraries further include a list of hotel reservations, and wherein the set of grouping parameters comprises price, hotel class, brand, location, and amenities.

10. The computing device of claim 7, wherein the travel itineraries further include a list of rental car reservations, and wherein the set of grouping parameters comprises price, rental agency, model, type, pickup location, drop-off location, proximity, and features of the car.

11. The computing device of claim 7, wherein the respective link further indicates a number of itineraries in the cluster.

* * * * *